United States Patent [19]

Lippert et al.

[11] Patent Number: 5,944,859
[45] Date of Patent: *Aug. 31, 1999

[54] HOT GAS FILTER AND SYSTEM ASSEMBLY

[75] Inventors: Thomas Edwin Lippert, Murrysville; Kathryn Miles Palmer, Monroeville; Gerald Joseph Bruck, Murrysville; Mary Anne Alvin, Pittsburgh; Eugene E. Smeltzer, Export; Dennis Michael Bachovchin, Murrysville, all of Pa.

[73] Assignee: Siemens Westinghouse Power Corporation, Orlando, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/642,203

[22] Filed: May 6, 1996

[51] Int. Cl.$^6$ ................................................. B01D 46/04
[52] U.S. Cl. .......................... 55/302; 55/341.1; 55/507; 55/523; 55/DIG. 12
[58] Field of Search ........................ 55/302, 341.1, 55/341.4, 341.7, 377, 380, 505, 507, 523, DIG. 12

[56] References Cited

U.S. PATENT DOCUMENTS

| | | | |
|---|---|---|---|
| 1,012,122 | 12/1911 | Budil | 55/341.7 |
| 3,376,696 | 4/1968 | Wells et al. | 55/302 |
| 3,421,295 | 1/1969 | Swift et al. | 55/302 |
| 3,482,378 | 12/1969 | Noland | 55/302 X |
| 3,535,851 | 10/1970 | Riemsloh | 55/302 X |
| 3,699,747 | 10/1972 | Kroll | 55/302 X |
| 3,765,152 | 10/1973 | Pausch | 55/302 X |
| 4,161,389 | 7/1979 | Staffin et al. | 432/58 |
| 4,230,468 | 10/1980 | Rebours et al. | 55/302 X |
| 4,322,231 | 3/1982 | Hilzendeger et al. | 55/357 |
| 4,343,631 | 8/1982 | Ciliberti | 55/302 |
| 4,445,913 | 5/1984 | Nishiyama | 55/302 |
| 4,539,025 | 9/1985 | Ciliberti et al. | 55/302 |
| 4,560,396 | 12/1985 | O'Dell | 55/302 X |
| 4,735,635 | 4/1988 | Israelson et al. | 55/71 |
| 4,737,176 | 4/1988 | Lippert et al. | 55/505 X |
| 4,760,968 | 8/1988 | Binzen | 55/302 X |
| 4,904,287 | 2/1990 | Lippert et al. | 55/302 |
| 4,973,459 | 11/1990 | Lippert et al. | 55/302 X |
| 5,078,760 | 1/1992 | Haldipur et al. | 55/302 X |
| 5,143,530 | 9/1992 | Haldipur et al. | 55/341.1 |
| 5,173,098 | 12/1992 | Pipkorn | 55/302 X |
| 5,421,847 | 6/1995 | Akitsu | 55/302 |
| 5,433,771 | 7/1995 | Bachovchin et al. | 55/302 X |
| 5,460,637 | 10/1995 | Connolly et al. | 55/523 X |
| 5,500,029 | 3/1996 | Zievers et al. | 55/523 X |
| 5,531,798 | 7/1996 | Engström et al. | 55/302 X |

FOREIGN PATENT DOCUMENTS

| | | |
|---|---|---|
| 0089114 | 9/1983 | European Pat. Off. . |
| 0620034 | 10/1994 | European Pat. Off. . |
| 0681858 | 11/1995 | European Pat. Off. . |
| 0698410 | 2/1996 | European Pat. Off. . |

Primary Examiner—Robert Spitzer

[57] ABSTRACT

A filter element for separating fine dirty particles from a hot gas. The filter element comprises a first porous wall and a second porous wall. Each porous wall has an outer surface and an inner surface. The first and second porous walls being coupled together thereby forming a substantially closed figure and open at one end. The open end is formed to be coupled to a hot gas clean up system support structure. The first and second porous walls define a channel beginning at the open end and terminate at the closed end through which a filtered clean gas can flow through and out into the clean gas side of a hot gas clean up system.

18 Claims, 7 Drawing Sheets

HOT GAS FILTER AND SYSTEM ASSEMBLY

STATEMENT OF GOVERNMENT INTEREST

The United States Government has rights in this invention pursuant to Contract No. DE-AC21-86MC23252 with the Department of Energy.

FIELD OF THE INVENTION

This invention relates generally to high temperature gas cleanup systems and more particularly to a hot gas filter for filtering fine dirty particulates from a gas.

BACKGROUND OF THE INVENTION

Hot gas cleanup systems that are implemented to clean particulate matter from a gas stream are well known in the art. These systems are currently used to clean coal fired gas, (i.e. pressurized fluidized-bed combustion gas; gasification, applications), and waste incineration. Additionally, gas cleanup systems may be applied to catalyst and precious metal recovery, calcination, catalytic cracking, and material recovery during chemical processing.

Conventional hot gas cleanup systems generally comprise a filter assembly which is mounted within a pressure vessel having a clean gas side and a dirty gas side. The filter assembly further comprises a plurality of filter element arrays, a tube sheet for supporting the filter element arrays, plenum pipes for channeling filtered clean gas to a desired location within the cleanup system, and a back pulse system for cleaning particulates from the outer surface of the filter elements. These systems may employ various types of filter elements to filter particulate matter from a gas stream.

Typical filter elements employed to filter particulate matter include cross-flow filters, ceramic and/or sintered metal circular cylindrical filters (candle and/or tubular filters), and ceramic bag filters. These filter elements are generally mounted within a pressure vessel so that a hot gas can flow through the filter elements such that a substantial part of fine particulate matter within the process gas can be removed therefrom.

Typically, as a gas stream flows through a filter element, fine particulates collect on the outer surface of the filter elements while the clean gas flows through the filter media, into the plenum pipes, and out into the clean gas side of the pressure vessel. A substantial amount of the fine particulate matter that is collected on the outside of the filter is removed therefrom by a reverse gas pulse provided by the back pulse system.

During abnormal process operation, bridging of ash between adjacent filter elements and/or metal structures can occur. The bridging of ash can contribute to the failure or breakage of filter elements which would require that the entire system be shut down for days so that the filter elements can be replaced. It would therefore be desirable to provide a filter element and/or system that reduces the potential for bridging of ash.

Conventional filter arrays packaged within the pressure vessel may not optimally utilize the internal vessel space. It would therefore be desirable to provide a filter element that when optimally packaged within the pressure vessel will provide increased filtering surface area through which a gas can flow.

Additionally, conventional filters have the tendency to break or fracture because of the relatively heavy weight and geometry of the filters when being handled or manipulated within the cleanup system. It would therefore be desirable to provide a more robust and durable filter.

SUMMARY OF THE INVENTION

The present invention embodies a filter element for separating fine dirty particles from a hot gas. The filter element comprises a first porous wall and a second porous wall. Each porous wall has an outer surface and an inner surface. The first and second porous walls are coupled at a first closed end and open at a second end. The open end is formed to be coupled to a hot gas clean up system support structure. The first and second porous walls define a channel beginning at the open end and terminate at the closed end through which a filtered clean gas can flow into the clean gas side of a hot gas cleaning system.

BRIEF DESCRIPTION OF THE DRAWINGS

The accompanying drawings which are incorporated in and constitute a part of the specification, illustrate one embodiment of the invention and together with the description, serve to explain the principles of the invention.

The invention will now be further described by way of example, with reference to the accompanying drawings, in which.

DETAILED DESCRIPTION OF THE PRESENT INVENTION

Figure 1:
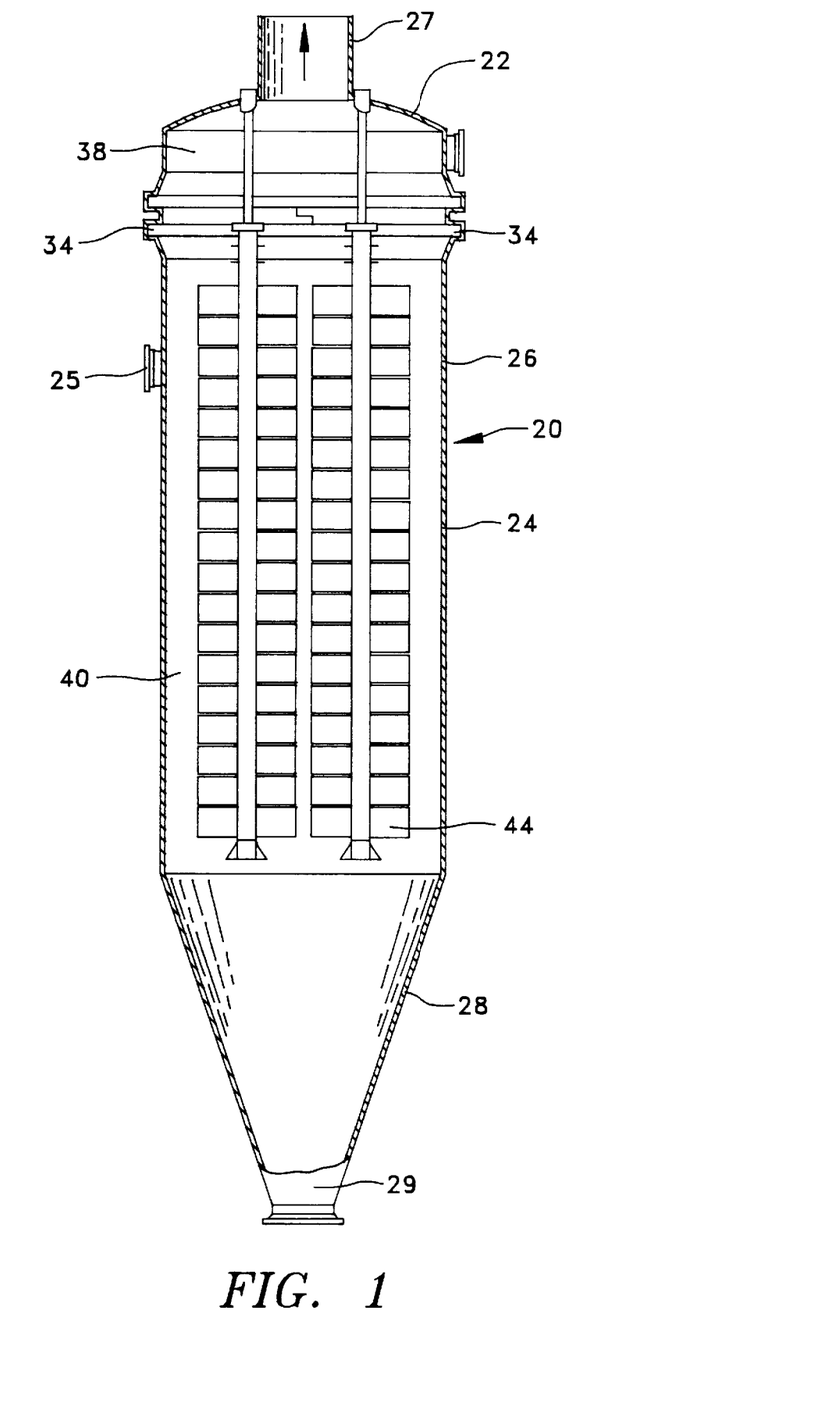
FIG. 1 is longitudinal view of a hot gas cleanup system.
Figure 2:
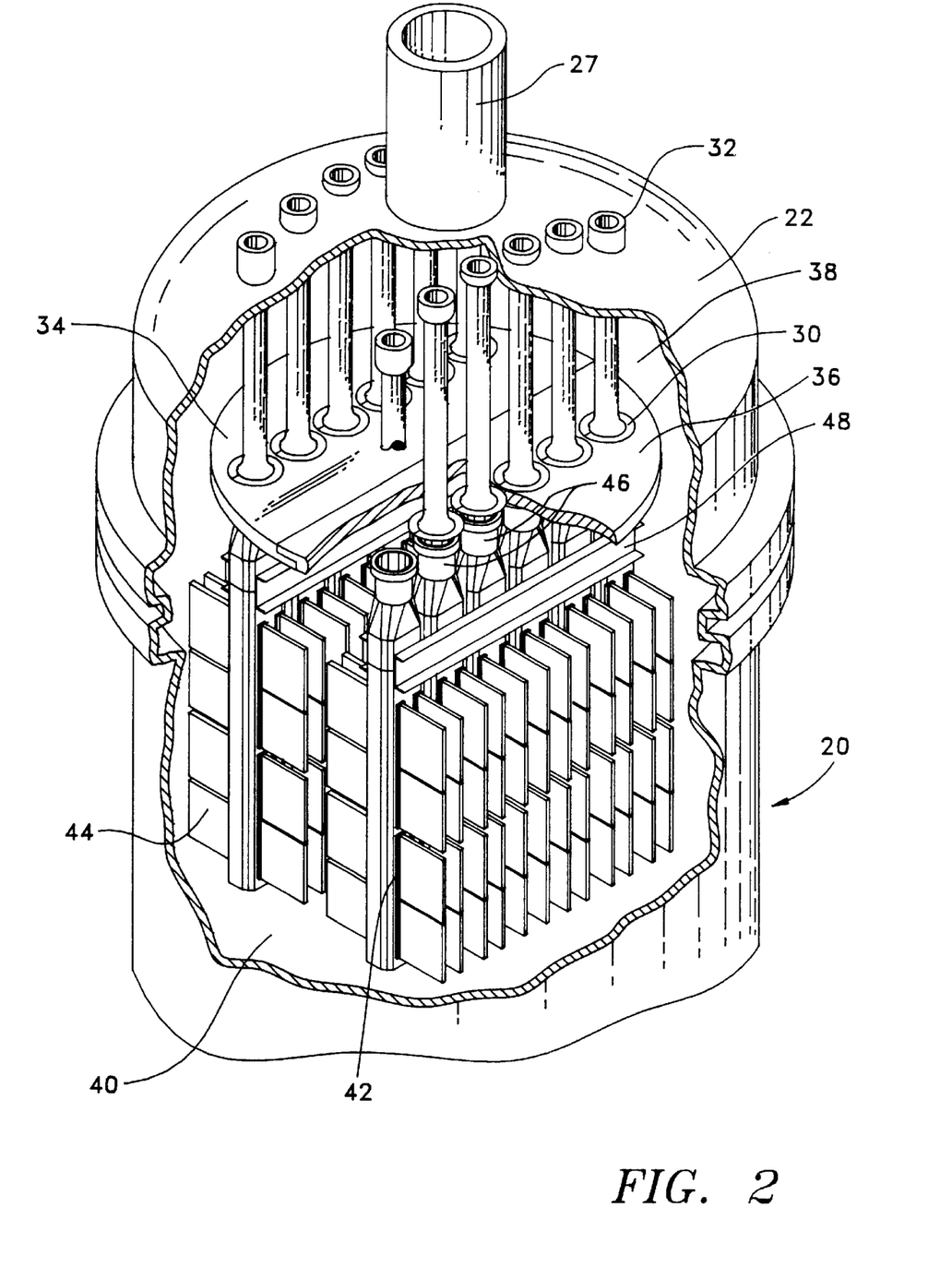
FIG. 2 is a perspective view of the hot gas cleanup system shown in FIG. 1 incorporating the preferred filter embodiment in accordance with the present invention.

FIGS. 1 and 2 show a filtering apparatus for separating particulate matter from a dirty gas stream. Referring to FIG. 1, the pressure vessel 20 has a dome-shaped head 22 and a body 24. The dome-shaped head 22 terminates in a linear tip defining an exit opening or nozzle 27 for the gas processed in the pressure vessel 20. The body 24 includes a dirty gas inlet 25, an upper part 26 having a generally circular cylindrical shape joined by a frusto conical lower part 28 for receiving the particulate matter terminating in a linear tip defining an opening or nozzle 29 connected to an ash discharge line (not shown) for collecting particulate matter. In addition, the left 34 and right split tubesheet 36 are shown dividing the pressure vessel 20 into a clean gas side 38 and a dirty gas side 40. The filter elements 44 in accordance with the present invention are shown secured within the dirty gas side 40.

Referring to FIG. 2, the filter support structures and plenum pipe 42 are shown attached to the corresponding split tubesheet 34, 36. The filter elements 44 in accordance with the present invention are shown coupled to the support structures 42 within the dirty gas side 40 of the pressure vessel 20. The top of filter support structure plenum pipes 46 for channeling the filtered clean gas to the clean gas side 38 of the pressure vessel 20 are shown coupled to the support bar 48 and the split tubesheet 34, 36. A plurality of ports 30 extend from the dome-shaped head 22. The back pulse pipe assembly 32 (back pulse system not shown) is coupled to the ports 30 to provide the necessary back pulse gas to clean or remove particulate matter from the filter elements 44.

Figure 3:
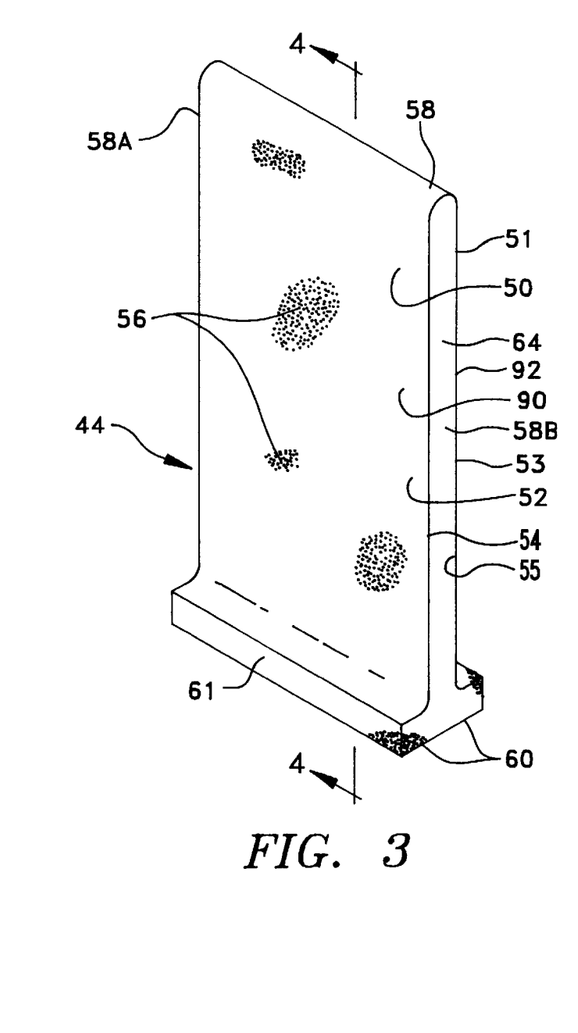
FIG. 3 is a perspective view of the preferred filter element in accordance with the present invention.

Referring to FIG. 3, the preferred embodiment of a filter element 44 is shown. The filter element 44 comprises a first porous wall 50 and a second porous wall 51. Each porous wall has an outer surface 52, 53 and an inner surface 54, 55. Each wall 50, 51 contains pores 56 that may range between about 1 micron to about 40 microns which permit a gas to flow through and prevent the particulate matter from passing through.

The first and second porous wall outer surfaces 52, 53 are preferably substantially flat, rigid, and seamless (not laminated). Alternately, each wall 50, 51 may contain pores that range between 1 micron to about 500–600 microns. For said structure, an outer membrane 90, 92, is applied to prevent particulate matter from passing through the first and second porous wall 50, 51.

The first and second porous walls 50, 51 are formed in communication with one another at a closed end 58 and remain open at an opposing support end 60, and by a left side wall 58a, and a right side wall 58b. It is preferable that the first and second porous walls 50, 51 be coupled at the closed end 58 such that the two porous walls remain substantially parallel to each other and define a channel 64. The support end 60 is preferably formed in the shape of a flange 61 such that it can be supportingly coupled with the support structure plenum pipe 42 to secure the filter elements 44 within the pressure vessel 20 as shown in FIG. 2.

Figure 4:
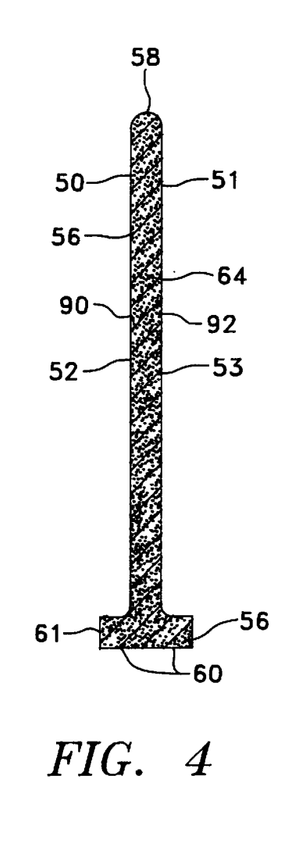
FIG. 4 is a sectional view taken along line 4—4 of the filter element shown in FIG. 3.

Referring to FIG. 4, the first and second porous walls 50, 51 define a channel 64 beginning at the filter element open support end 60 and terminates at the filter element closed end 58. The channel 64 provides a path through which the filtered clean gas can flow into the plenum pipes 42.

The filter porous walls 50, 51 can be formed in other flat ridged shapes or from porous walls that are sintered together to form laminated layers. The shape and size of the filter walls 50, 51 may depend on the application for which the filter element 44 is used and the materials of construction. Some of the materials that can be employed to produce the filter element comprise a ceramic material, monolithic ceramic material, composite ceramic material, and sintered metal material.

Alternatively, the present invention may provide a first and second porous wall formed to be of the barrier or bulk filter element type. The barrier type filter element porous walls define pores 56 which permit gas to flow through and capture the particulate matter on the filter outer surface 52, 53.

A bulk filter element in accordance with the present invention comprises a first and second porous wall which define pores that permit a gas to flow through. The bulk filter element is formed such that particulate matter will collect on the filter outer surface 52, 53 and within the pores 56, thereby filling or restricting gas passage through the first and second porous walls 50, 51.

In another embodiment of the present invention, at least one membrane layer may be applied to each of the filter embodiment outer surfaces, inner surfaces, or both surfaces. The membrane would provide additional filtering capabilities of the filters. The membrane layers 90, 92 are provided to prevent particulate matter from penetrating the filter pores when either the back pulse system is activated or during normal gas flow. The filter membrane can be any material that can be applied to the filter element that would allow particulates to be filtered from a gas and allow process gas to flow through the filter element into the plenum pipes 42, or pulse cleaning gas through the porous filter walls 50, 51.

Figure 5:
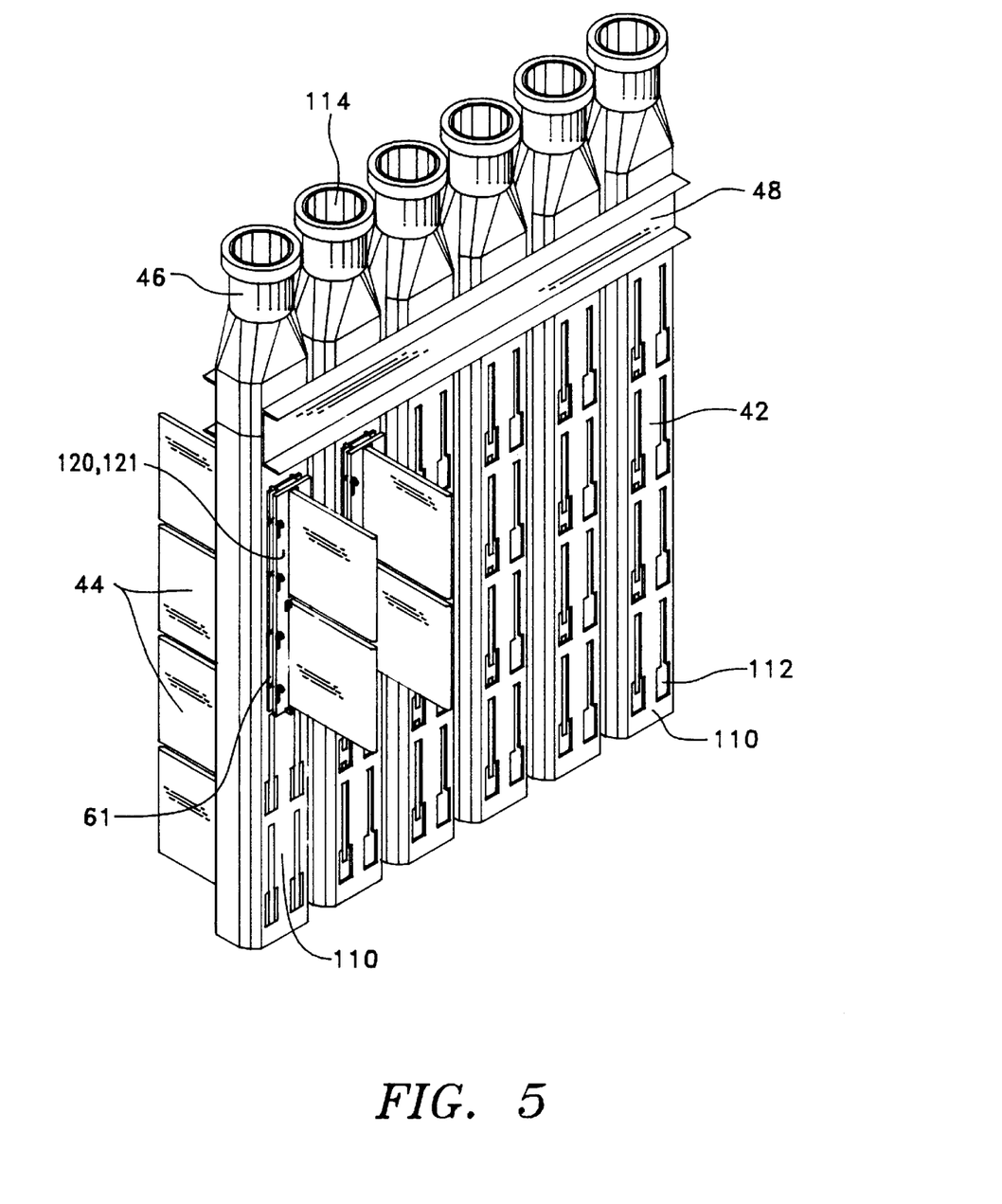
FIG. 5 is a perspective view of a filter support structure and filter assembly.

Referring to FIG. 5, the filter element support plenum pipe structure 42 for supporting each filter element 44 within the pressure vessel 20 is shown. The plurality of filter element support plenum pipe structures are rigidly positioned by a support bar 48. Each filter element support plenum pipe 42 has sidewalls 110 having a plurality of slots 112 that are formed to be coupled with a filter element flange 61 and gasket assembly 120, 121. The filter element 44, and filter element support plenum pipe structure 42 arrangement preferably provides a relative vertical chamber which allows ash to dislodge and fall unobstructed into the particulate nozzle 29.

The plenum pipe sidewall 110 defines an interior channel 114 through which filtered clean gas can flow into and to the clean side 38 of the pressure vessel 20, see FIG. 1. The support bar 48 preferably has a C-shaped cross-section.

Figure 6:
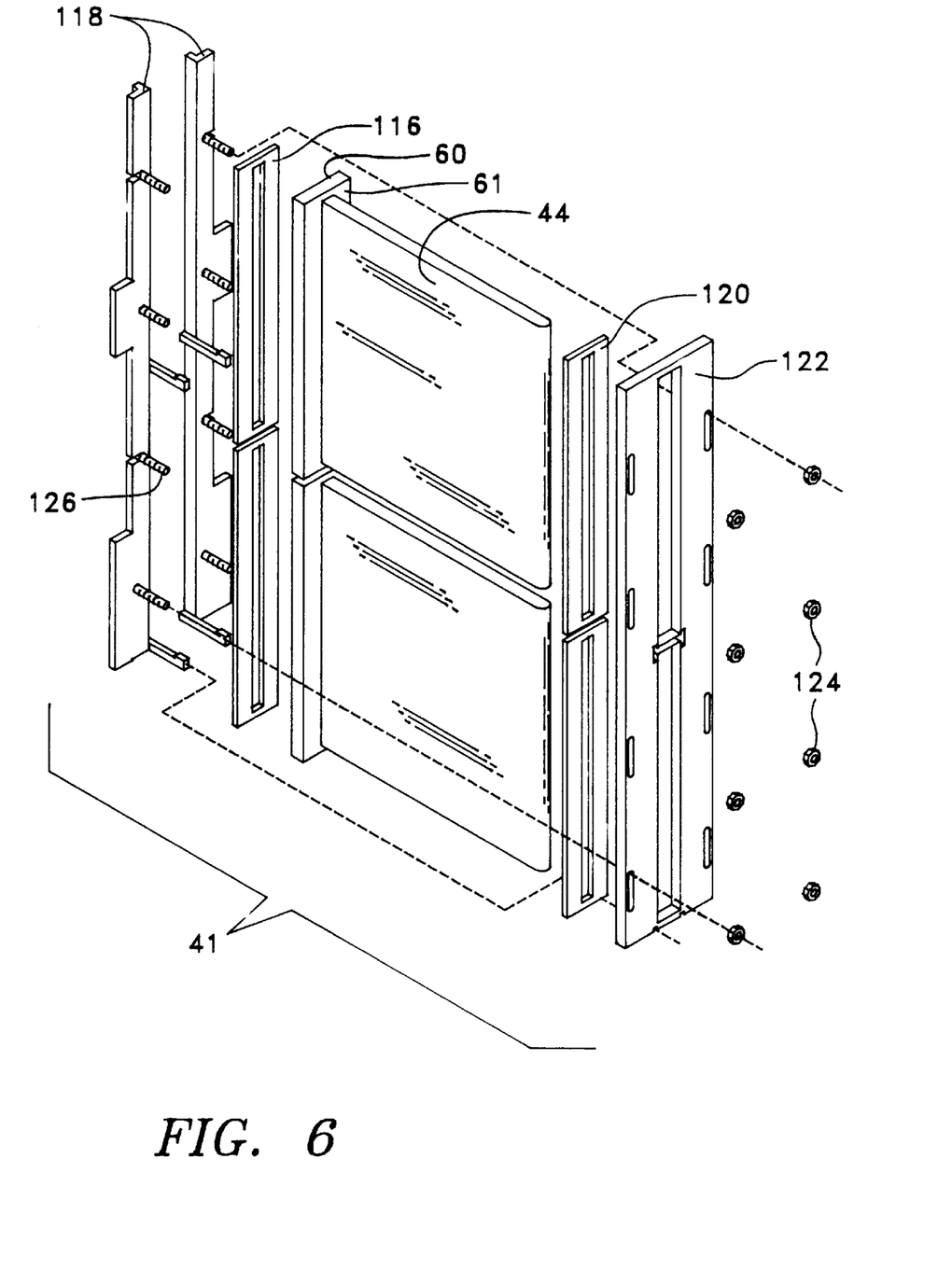
FIG. 6 is an exploded view of the filter element shown in FIG. 4 and corresponding attachment assembly.

FIG. 6 shows the filter element attachment assembly 41 that is employed to secure each filter element 44 to the support structure 42 shown in FIG. 5. Each filter element 44 is attached with at least one gasket or ceramic mat 116 positioned between the filter element flange support end 60, 61 and a rear bracket 118 and at least one gasket or ceramic mat 120 positioned above the filter element flange support end 60, 61 and a front bracket 122 to prevent gas from travelling past the filter element into the plenum pipe interior chamber 114 (shown in FIG. 5). In addition, one gasket or ceramic mat, not shown, is positioned between the rear bracket 118 and the sidewall 110 of the filter element support plenum pipe 42. The filter element 44, gaskets 116, 120, and brackets 118, 122 are preferably coupled together with nuts 124 and bolts 126.

Figure 7:
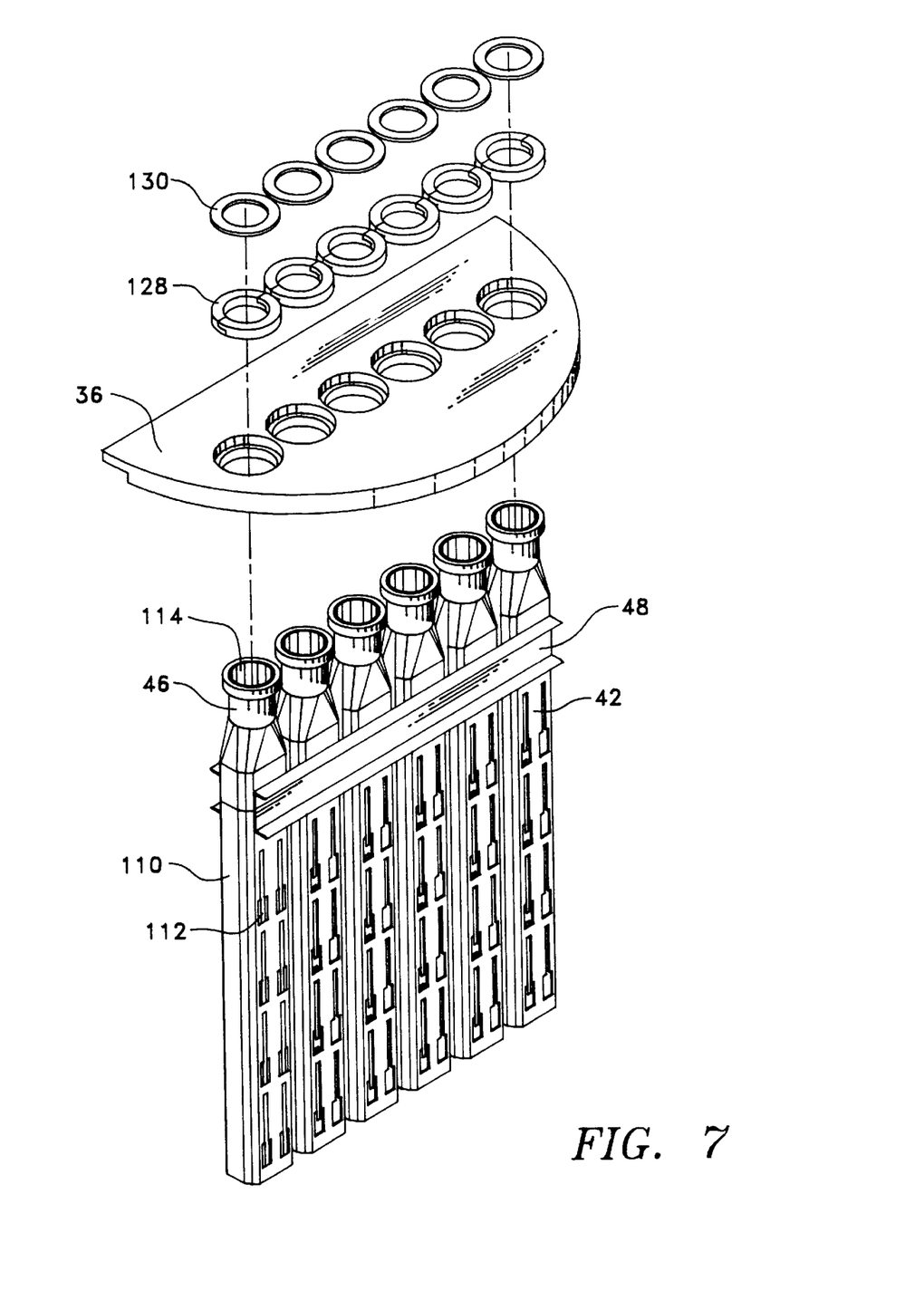
FIG. 7 is an exploded view of a tubesheet and the support structure assembly.

Referring to FIG. 7, the filter element support structure plenum pipe 42, support bar 48, split tubesheet 36, retaining ring 128 and dust ring 130 are shown. The retaining rings 128 and dust rings 130 are provided to prevent a gas from traveling past the split tubesheet 34, 36 and into the clean side 38 above the dome-shape head 22 of the vessel 20 shown in FIGS. 1 and 2.

The support bar 48 securely holds the filter element support structure plenum pipe 42 in alignment so that the corresponding split tubesheet 34, 36, retaining rings 128 and dust rings 130 can be securely mounted within the pressure vessel 20.

In accordance with the present invention, the array of filter elements 44, as shown in FIGS. 1 and 2, provide additional space between each filter element 44 relative to conventional filter element designs for a given vessel foot print, thereby, reducing the potential for ash formation between filter elements. A further advantage of this arrangement is an increased filter surface area through which the hot gas flows and is filtered within a defined vessel footprint. The filter arrangement also provides easy maintainability, handling, and repair of filter elements.

Figure 8:
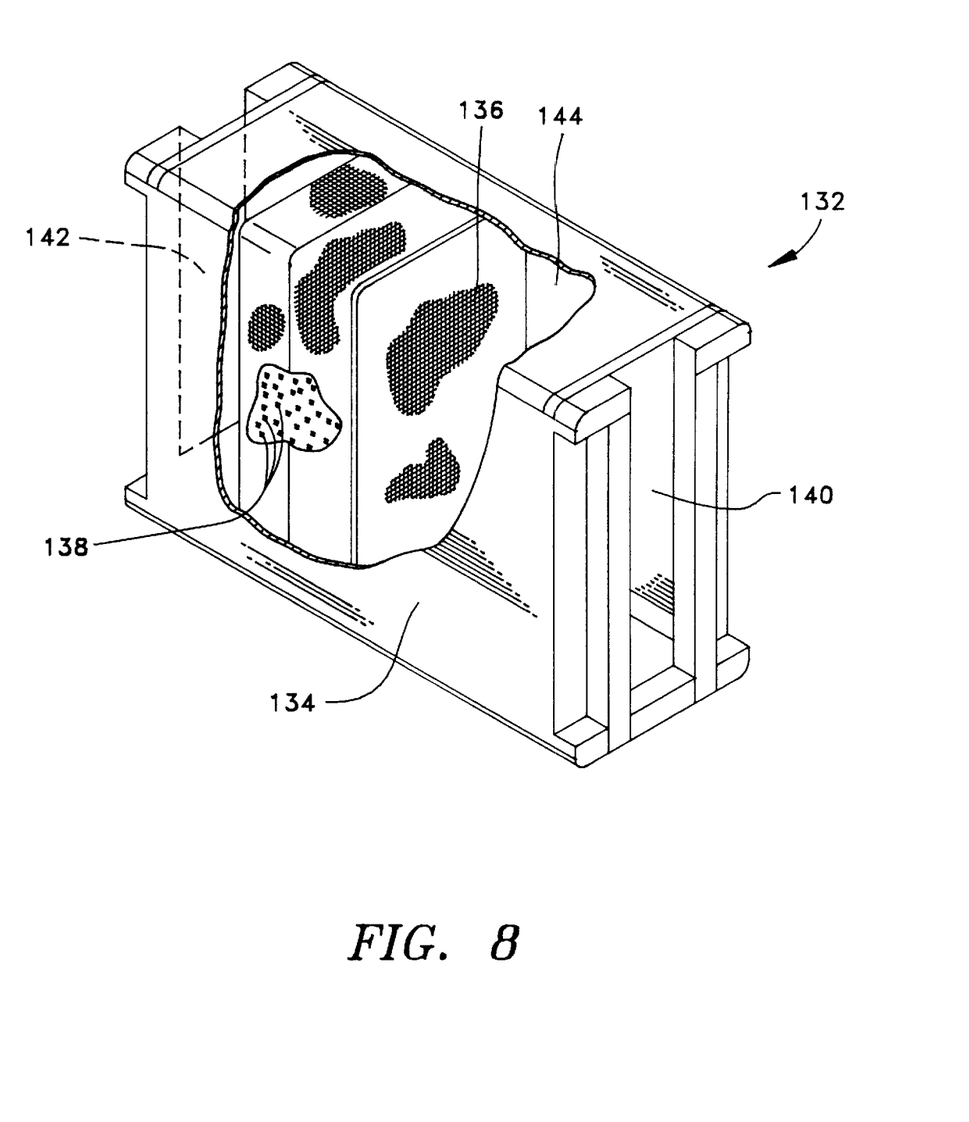
FIG. 8 is a perspective view of a fail-safe regenerator.

Optionally, a fail-safe/regenerator 132, shown in FIG. 8, may be employed with the filter support plenum pipe assembly 42 shown in FIG. 7. The fail-safe/regenerator 132 is designed to be securely coupled adjacent to the filter element flange end 60 shown in FIGS. 3 and 4. The fail-safe/regenerator 132 comprises a housing 134 which defines an interior chamber 144; a particulate barrier 136; and heating media, such as a box of heating pieces 138.

The housing 134 preferably has a generally rectangular shape that is formed to be coupled between the filter flange end 60 and the plenum pipe slot 112 shown in FIGS. 5 and 7. The housing 134 has a gas flow inlet end 140 and outlet end 142. The inlet end 140 is formed to be securely coupled adjacent the filter flange end 60, ceramic mat or gasket 116 and rear bracket 118 shown in FIG. 6. The outlet end 142 directs clean gas through the plenum pipe 42 to the clean gas side 38 of the filter vessel.

The particulate barrier 136 is securely mounted between the inlet end 140 and outlet 142 end. The particulate barrier 136 is preferably a metal screen, but can also be a ceramic felt mat, continuous fibers, reticulated foam monolithic ceramic thin filter, or ceramic composite thin filter. The particulate barrier 136 is formed to allow clean gas and back pulse gas to flow through, and to also prevent ash from travelling into the clean gas side 38 of the system.

The heating media or box of heating pieces 138 is placed between the particulate barrier 136 and outlet end 142. The heating media or box of heating pieces 138 are provided to heat the cooler back pulsed gas to prevent the filter element from enduring thermal shock or fatigue during pulse cleaning. The heating pieces 138 are preferably made of a metal material, such as 310 stainless steel.

In operation, the cleanup system in accordance with the present invention permits particulate laden gas to enter in through the dirty gas inlet 25. Particulates from the dirty gas collect on the outer surface 52, 53 of each filter element 44. The filtered clean gas proceeds through the porous filter walls 50, 51, through the filter element channel 64, and into the interior channel 114 of the plenum pipes 42. The gas proceeds through the plenum pipes 42 to the clean side 38 of the split tubesheets 34, 36. The clean gas then proceeds through the dome gas outlet 27. Periodically the filter elements 44 are cleaned by short blasts of compressed gas through the back pulse pipe assembly 32, which dislodges the particulates from the filter elements.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A filter element for separating fine particles from a hot gas comprising:
    a first porous wall and a second porous wall, each porous wall having an outer surface and an inner surface, said first and second porous walls being coupled together thereby forming a substantially closed figure having a closed end and an open end, said open end formed to be coupled to a hot gas clean up system support structure, said first and second porous walls defining a channel beginning at said open end and terminating at said closed end through which a filtered clean gas can flow into the clean gas side of a hot gas clean up system;
    wherein said first and second porous walls define a flange at said open end for attachment to said hot gas clean up system support structure; and
    wherein said first and second porous walls are comprised of either a monolithic ceramic, composite ceramic, or a sintered metal material.

2. The filter element of claim 1 wherein said first and second walls are substantially parallel.

3. The filter element of claim 1 wherein said first and second porous walls are a seamless filter.

4. The filter element of claim 1 further including a filter membrane on at least the outer surface of both said first and second porous walls.

5. The filter element of claim 1 further including a filter membrane on at least the inner surface of both said first and second porous walls.

6. The filter element of claim 1 wherein said first and second porous walls have pores formed therein between a range of about 1 micron through 40 microns.

7. The filter element of claim 1 wherein said first and second porous walls have pores formed therein up to about 600 microns, and a membrane layer in communication with the outer layers of the first and second porous walls.

8. The filter element of claim 1 wherein said first and second porous walls provide a barrier filter media such that a gas flows through the first and second porous walls and the particulates remain on the outer surface of the first and second walls.

9. The filter element of claim 1 wherein said first and second porous walls provide a bulk filter media such that a gas flows through the first and second porous walls and a portion of the particulate matter remains on the outer surface of the first and second walls and some particulate matter is captured within the wall, thereby restricting gas flow through the pores.

10. The filter element of claim 1, further comprising a fail-safe/regenerator device, said device having:
    a housing defining an interior chamber, said housing having a gas flow inlet and an outlet, said inlet being mounted adjacent said flange;
    a particulate barrier, said particulate barrier securely mounted within said housing chamber between said inlet and outlet, said particulate barrier formed to allow both a clean gas and back pulse gas to flow through, and to prevent particulate matter from traveling into the clean gas side of a pressure vessel and into the channel of other filter elements within the clean up system; and
    heating media arranged within said housing interior chamber to heat cooler back pulsed gas to prevent the filter element from experiencing thermal fatigue.

11. The assembly in claim 10 wherein said particulate barrier is either a metal screen, ceramic felt mat, or reticulated foam.

12. The assembly in claim 10 wherein said heating media is made of a metal material.

13. A filter element support structure for supporting a filter element comprising a first porous wall and a second porous wall, each porous wall having an outer surface and an inner surface, said first and second porous walls being coupled together thereby forming a substantially closed figure having a closed end and an open end, said first and second porous walls defining a channel beginning at said open end and terminating at said closed end through which a filtered clean gas can flow into a clean gas side of a hot gas clean up system, wherein said first and second porous walls define a flange at said open end for attachment to said filter element support structure and wherein said first and second porous walls are comprised of either a monolithic ceramic, composite ceramic, or a sintered metal material, said filter element support structure comprising:
    a plenum pipe, said plenum pipe having a sidewall defining a plurality of slots formed to receive and securely couple the open end of the filter element, said plenum pipe sidewall further defining an interior chamber through which a filtered clean gas can flow into a clean gas side of a pressure vessel;

a support bar for securely positioning the plenum pipes relative to a tubesheet;

a plurality of brackets for coupling the filter element adjacent to said plenum pipe slots; and a plurality of gaskets for preventing a gas from traveling past the filter element and plenum pipe.

14. The support structure in claim 13 wherein said support bar has a generally C-shaped cross-section.

15. A filter element support structure for supporting a plurality of sheet filter elements, each of said filter elements including a first porous wall and a second porous wall, said first and second porous walls being coupled together thereby forming a substantially closed figure having a closed end and an open end, said first and second porous walls defining a channel beginning at said open end and terminating at said closed end through which a filtered clean gas can flow, said filter element support system comprising:

a plurality of plenum pipes, each of said plenum pipes having a sidewall defining a plurality of slots formed to receive and securely couple the open ends of the filter elements, said plenum pipe sidewall further defining an interior chamber through which a filtered clean gas can flow into a clean gas side of a pressure vessel;

a plurality of brackets for coupling the filter element adjacent to said plenum pipe slots; and said plenum pipes being mounted vertically in said pressure vessel, and said slots in each of said plenum pipes being aligned vertically, whereby the walls of the filter elements are vertically oriented and the walls of adjacent ones of the filter elements are parallel to each other.

16. The filter element support structure of claim 15, wherein each of said brackets secures a flange formed by the walls of one of said filter elements to one of said plenum pipes.

17. The filter element support structure of claim 15, further comprising a support bar for securely positioning the plenum pipes relative to a tube sheet.

18. The filter element support structure of claim 15, further comprising a plurality gaskets for preventing a gas from traveling passed the filter elements and plenum pipes.

* * * * *